United States Patent
Groll et al.

(10) Patent No.: US 7,654,104 B2
(45) Date of Patent: *Feb. 2, 2010

(54) HEAT PUMP SYSTEM WITH MULTI-STAGE COMPRESSION

(75) Inventors: Eckard A. Groll, West Lafayette, IN (US); William J. Hutzel, Lafayette, IN (US); Stefan S. Bertsch, Lafayette, IN (US); David B. Bouffard, Biddleford, ME (US)

(73) Assignee: Purdue Research Foundation, West Lafayette, IN (US)

( * ) Notice: Subject to any disclaimer, the term of this patent is extended or adjusted under 35 U.S.C. 154(b) by 275 days.

This patent is subject to a terminal disclaimer.

(21) Appl. No.: 11/420,951

(22) Filed: May 30, 2006

(65) Prior Publication Data

US 2006/0266074 A1    Nov. 30, 2006

Related U.S. Application Data

(60) Provisional application No. 60/685,302, filed on May 27, 2005.

(51) Int. Cl.
F25B 13/00 (2006.01)

(52) U.S. Cl. ..................... 62/324.1; 62/510
(58) Field of Classification Search ............ 62/324.1, 62/160, 238.1, 260, 278, 238.6, 238.7, 165, 62/196.4, 199, 332, 175, 510; 165/240
See application file for complete search history.

(56) References Cited

U.S. PATENT DOCUMENTS

| | | | |
|---|---|---|---|
| 4,157,649 A | 6/1979 | Bussjager et al. | |
| 4,454,725 A * | 6/1984 | Cann | 62/117 |
| 4,586,351 A * | 5/1986 | Igarashi et al. | 62/468 |
| 4,594,858 A | 6/1986 | Shaw | |
| 4,672,822 A | 6/1987 | Iijima et al. | |
| 4,741,674 A * | 5/1988 | Tischer | 417/295 |
| 4,748,820 A * | 6/1988 | Shaw | 62/175 |
| 5,094,598 A | 3/1992 | Amata et al. | |

(Continued)

OTHER PUBLICATIONS

Michele Zehnder and Prof. Dr. D. Favrat; "Oil Migration On Single And Two Stage Heat Pump Systems"; Dec. 2000; Research program on ambient heat, waste heat and cogeneration of the Swiss Federal Office of Energy.

(Continued)

*Primary Examiner*—Cheryl J Tyler
*Assistant Examiner*—Justin Loffredo
(74) *Attorney, Agent, or Firm*—Hartman & Hartman, P.C.; Gary M. Hartman; Domenica N. S. Hartman (57) ABSTRACT

A multi-compressor heat pump system configured to provide heating and cooling over a range of ambient temperatures. The compressors can be operated independently and alone or together in series for maximum output. Heat exchangers are selectively fluidically connected to the compressors to enable refrigerant flow between the compressors and at least two heat exchangers in a manner that enables the heat pump system to be selectively operable in various modes. Preferred aspects include selectively operating the compressors based on the ratio of the evaporating and condensing pressures of the refrigerant within the heat pump system, a mixing chamber between the compressors, and a lubricant management system to prevent the accumulation of a lubricant in one of the compressors.

3 Claims, 3 Drawing Sheets

U.S. PATENT DOCUMENTS

| | | | |
|---|---|---|---|
| 5,284,204 A * | 2/1994 | Morgan | 165/219 |
| 5,369,958 A | 12/1994 | Kasai et al. | |
| 5,417,076 A * | 5/1995 | Vaynberg | 62/175 |
| 5,632,155 A * | 5/1997 | Sugiyama et al. | 62/179 |
| 5,927,088 A * | 7/1999 | Shaw | 62/175 |
| 5,970,728 A | 10/1999 | Hebert | |
| 6,276,148 B1 | 8/2001 | Shaw | |
| 6,722,156 B2 * | 4/2004 | Tanimoto et al. | 62/510 |
| 7,302,807 B2 * | 12/2007 | Yakumaru et al. | 62/238.6 |

OTHER PUBLICATIONS

An E Source Multi-Client Study; "Will the Low-Temperature Heat Pump Flatten Peak Heating Loads?"; Platts.

Stefan S. Bertsch, Eckhard A. Groll, David B. Bouffard, and William J. Hutzel; "Review of Air-Source Heat Pumps For Low Temperature Climates".

* cited by examiner

HEAT PUMP SYSTEM WITH MULTI-STAGE COMPRESSION

CROSS REFERENCE TO RELATED APPLICATIONS

This application claims the benefit of U.S. Provisional Application No. 60/685,302, filed May 27, 2005, the contents of which are incorporated herein by reference.

BACKGROUND OF THE INVENTION

The present invention relates generally to heating and cooling systems, and more particularly to a heating and cooling system with multiple compressors.

Conventional heat pump systems utilize a reversible refrigerant flow to both heat and cool enclosed spaces, typically a building such as a house. In a heating cycle of a typical heap pump system, a compressor compresses a vaporized refrigerant to a high pressure and directs the resulting hot refrigerant vapor to an indoor heat exchanger functioning as a condenser. The indoor heat exchanger draws heat from the condensation of the refrigerant vapor to heat the house. The resulting cooled and liquid refrigerant is then directed to an expansion device and an outdoor heat exchanger where, under reduced pressure, heat is drawn from the outdoor environment to evaporate the liquid refrigerant. The resulting vaporized refrigerant is then directed back to the compressor where the refrigerant vapor is again compressed to continue the cycle.

To cool the house, the cycle is reversed. The compressor compresses the refrigerant vapor to a high pressure and directs the resulting hot refrigerant vapor to the outdoor heat exchanger, now functioning as the condenser, which releases heat to the outdoor environment from condensation of the refrigerant vapor. The cooled liquid refrigerant is than directed to the expansion device and the indoor heat exchanger where, under reduced pressure, heat is drawn from the house interior to evaporate the liquid refrigerant. The refrigerant vapor is then directed back to the compressor where the refrigerant vapor is again compressed to continue the cycle.

Conventional heat pumps have found widespread residential application due to their ease of installation and use. Conventional heat pumps are also economical to install and use, at least in milder climates, because the same components can be used for both heating in colder months and cooling in warmer months. However, in colder northern climates, the use of heat pumps presents additional challenges. One issue is that the performance of heat pump systems decreases in colder temperatures when heating capacity is most needed. Although heat pump systems that contain a single compressor may be designed to operate at very low ambient temperatures, such systems show decreased performance at higher temperatures. Also, the heating capacity of a single-compressor system will greatly exceed the cooling capacity of the system, providing an inefficient and wasteful heating-to-cooling capacity ratio. A system with excess heating capacity will also have to cycle on and off more frequently at higher ambient temperatures in order to reduce its capacity, leading to a reduced life span and decreased system efficiency. Proposed solutions include the use of variable speed compressors, parallel compressors, and variable displacement compressors. These solutions, however, increase the price of the system and eliminate the biggest advantage of the heat pump, namely, its low installation cost.

To provide increased heating capacity during the winter in northern climates, heat pumps have often been installed with a separate, backup heating system such as an electrical heating system. The supplemental heating system, however, reduces the desirability of a heat pump in the first place, and leads to significantly increased energy costs during the coldest months of the year. To address these issues, heat pump systems have been proposed that use compressors connected in series. A primary compressor is used for cooling the house during warmer months and heating the house in cooler months. During extremely cold conditions, a booster compressor is operated in series with the primary compressor to increase the system heating capacity. Multi-compressor heat pump systems are described in U.S. Pat. Nos. 5,927,088 and 6,276,148, both to Shaw. In the Shaw patents, compressor operation is determined by sensing the indoor and outdoor temperatures, and optionally the pressure immediately upstream of the primary compressor. In each of these patents, an economizer is used to increase the heating capacity of the system by bleeding a portion of the refrigerant flow from the main flow, expanding and cooling the bled portion, and then directing the bled portion through the economizer where it subcools the main flow of refrigerant flowing through the economizer to the evaporator. The bled refrigerant is then directed to the inlet of the primary compressor.

Although useful for increasing the heating capacity of the system, multiple compressors and an economizer present additional challenges in the design of an integrated heating and cooling system. To function properly, a compressor requires a lubricant that is typically entrained in the refrigerant delivered to the compressor, and may thus circulate through the system with the refrigerant. In systems with multiple compressors, the lubricant may migrate to one of the compressors, accumulating in the compressor and leading other compressors in the system to fail from lack of lubricant. U.S. Pat. No. 6,276,148 to Shaw addresses this issue with aspiration tubes in the compressors to draw lubricant from compressors with high lubricant levels. The lubricant drawn from a compressor is entrained in the refrigerant and circulated through the entire system to the other compressor. However, the entrained lubricant reduces the heating and cooling capacity of the system because the lubricant serves no purpose on the heat exchange side of the system.

U.S. Pat. No. 4,586,351 to Igarashi discloses a lubricant management system for a multi-compressor heat pump system that prevents the circulation of lubricant to the heat exchange side of the heat pump system. Lubricant entrained in the refrigerant leaving the compressors is separated from the refrigerant in a lubricant separator. The lubricant is then redirected to an accumulator that mixes the lubricant with the refrigerant returning to the inlet side of the compressors. Although useful for preventing the circulation of lubricant on the heat exchange side of the system, Igarashi does not appear to address the problems inherent in attempting to balance the lubricant level between two compressors connected in series and operating at different pressure levels.

The use of an economizer also presents certain challenges. After being bled from the main refrigerant line and allowed to expand, the refrigerant circulated through the economizer and returned to the compressors is typically in a two-phase state of both liquid and vapor. To some degree, the two-phase refrigerant from the economizer mixes with the refrigerant vapor from the evaporator before entering the compressors. However, liquid refrigerant can impair the operation of a compressor, and the prior art appears to lack means for ensuring adequate mixing of the two-phase refrigerant from the economizer with the refrigerant vapor from the evaporator.

BRIEF SUMMARY OF THE INVENTION

The present invention provides a multi-compressor heat pump system configured to provide efficient heating and cooling over a wide range of ambient temperatures.

According to a first aspect of the invention, the compressors can be operated independently, either alone or together in series for maximum output. In this embodiment, at least two compressors are part of a compressor section of the heat pump system. First and second heat exchangers are selectively fluidically connected to the compressor section to enable flow of a refrigerant between the compressor section and the first heat exchanger, between the first and second heat exchangers, and between the compressor section and the second heat exchanger. Valves control the flow of the refrigerant through the compressors and the first and second heat exchangers. The valves are controlled so that the heat pump system is selectively operable in each of the following modes: the compressors operate in series wherein the a first compressor operates as a low stage compressor and a second compressor operates as a high stage compressor; the first compressor operates independently and the second compressor is bypassed by the refrigerant; and the second compressor operates independently and the first compressor is bypassed by the refrigerant.

According to this aspect of the invention, the heat pump system provides increased flexibility while allowing for the use of relatively lowcost fixed-speed compressors. Alternatively, one of the compressors may be a variable capacity compressor with a high and low setting to provide additional flexibility in the capacity of the system. An economizer may also be used to provide still further flexibility and increased total output for the system. According to a preferred aspect of the invention, one or both of the compressors of the heat pump system can be selectively caused to operate based on a ratio of the evaporating and condensing pressures of the refrigerant within the heat pump system, as opposed to sensing temperatures to control the system. With this approach, only one of the compressors is operated if the ratio is less than a predetermined value for the ratio, and both compressors are operated if the ratio is greater than the predetermined value. As such, if the pressure ratio were to rise to a level at which the compressors could be damaged if operated individually, the other compressor is started to provide a two-stage operating mode.

According to another aspect of the invention, a heat pump system is provided having a compressor section with at least two compressors, first and second heat exchangers selectively fluidically connected to the compressor section to enable flow of a refrigerant between the compressor section and the first heat exchanger, between the first and second heat exchangers, and between the compressor section and the second heat exchanger, and valves for controlling the flow of the refrigerant through the compressors and the first and second heat exchangers, wherein the valves are controlled so that the heat pump system is selectively operable in a first mode in which the compressors operate in series and a second mode in which only one of the compressors operates independently and the other compressor(s) is bypassed by the refrigerant. According to this embodiment, the heat pumping system includes a mixing chamber fluidically connected to the outlet of a first of the compressors and to the inlet of a second of the compressors, and an economizer fluidically connected to the first heat exchanger, fluidically connected to the second heat exchanger, and selectively fluidically connected to the mixing chamber. A first portion of the refrigerant flowing between the first and second heat exchangers is selectively delivered to the mixing chamber for mixing with a second portion of the refrigerant flowing into the mixing chamber from the outlet of the first compressor if the first and second compressors are operating in series. The first portion of the refrigerant is not delivered to the mixing chamber if the first and second compressors are not operating in series. In this manner, liquid refrigerant that may be entrained in the first portion of the refrigerant leaving the economizer can be thoroughly dispersed in the vapor leaving the first compressor before entering the second compressor when both compressors are operated, but is prevented from entering the second compressor if only the second compressor is operating.

According to yet another aspect of the invention, a heat pump system is provided with a lubricant management system to prevent the accumulation of a lubricant in one of the compressors of the heat pump system. As with the previous embodiments, the heat pump system has a compressor section with at least two compressors, first and second heat exchangers selectively fluidically connected to the compressor section to enable flow of a refrigerant between the compressor section and the first heat exchanger, between the first and second heat exchangers, and between the compressor section and the second heat exchanger, and valves for controlling the flow of the refrigerant through the compressors and the first and second heat exchangers, wherein the valves are controlled so that the heat pump system is selectively operable in a first mode in which the compressors operate in series and a second mode in which only one of the compressors operates independently and the other of the first and second compressors is bypassed by the refrigerant. According to this embodiment, the heat pumping system includes a lubricant equalization conduit fluidically coupled to the compressors, and a valve for selectively fluidically connecting the compressors through the lubricant equalization conduit and for selectively controlling flow of the lubricant through the lubricant equalization conduit to provide for equalization of levels of the lubricant in the compressors when the compressors are not operating. This approach also preferably employs a lubricant separator to remove the lubricant from the refrigerant leaving the compressor section and return the removed lubricant back to the inlets of the compressors.

In view of the above, the present invention provides a multi-compressor heat pump system capable of being operated without a backup heating system in colder climates, yet can be economical to install and use. The multiple compressors can be operated independently to provide variable capacity or operated in series to provide maximum capacity, and optionally with an economizer to provide increased total capacity for the system and increased flexibility in the system capacity. According to preferred aspects of the invention, the compressors can be independently operated, with or without an economizer, while avoiding certain complications associated with multi-compressor heat pump systems that utilize economizers. In particular, when operated with an economizer, the heat pump system preferably utilizes a mixing chamber to ensure effective mixing of liquid-containing refrigerant from the economizer and vaporized refrigerant prior to entering a compressor. Furthermore, the heat pump system preferably includes a lubricant management system that prevents lubricant from circulating with the refrigerant in the heat exchangers of the system, and effectively equalizes the lubricant level between the compressors connected when operated in series at different pressure levels.

Other objects and advantages of this invention will be better appreciated from the following detailed description.

DETAILED DESCRIPTION OF THE INVENTION

Figure 1:
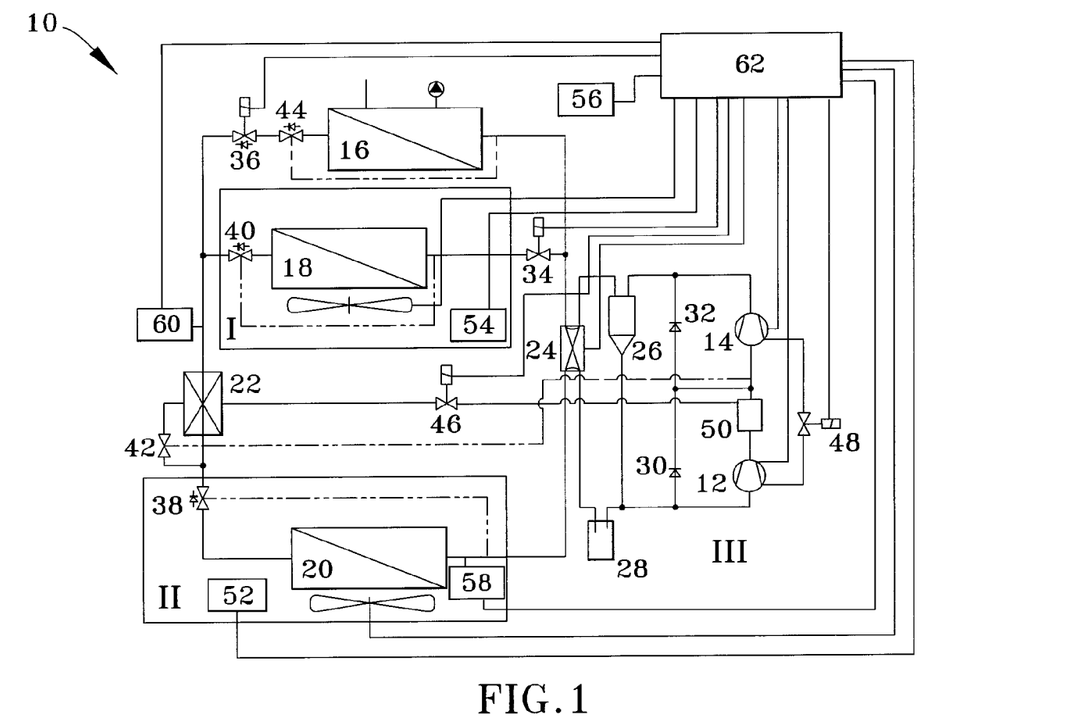
FIG. 1 schematically represents a multi-compressor heat pump system in accordance with a preferred embodiment of this invention.

A heat pump system 10 in accordance with a preferred embodiment of the present invention is schematically represented in FIG. 1. The heat pump system 10 will be described with particular reference to residential house applications in nordic climates, though it will be understood that the system 10 of this invention can find use in other applications and operating environments.

As shown in FIG. 1, the heat pump system 10 includes a low-stage compressor 12, a high stage compressor 14, an indoor refrigerant-water heat exchanger 16, an indoor refrigerant-air heat exchanger 18 for delivering heating and cooling air to the interior of the house (not shown), an outdoor refrigerant-air heat exchanger 20, a closed economizer 22, a four-way reversing valve 24, a lubricant separator 26, a suction gas accumulator 28, check valves 30 and 32 in fluidic parallel with the compressors 12 and 14, respectively, a control valve 34 for adjusting the refrigerant flow rate through the heat exchanger 18, a solenoid valve 36 to block refrigerant flow to the heat exchanger 16, expansion devices 38, 40, 42, and 44 to control refrigerant flow through the heat exchanger 20, heat exchanger 18, economizer 22, and heat exchanger 16, respectively, a solenoid valves 46 and 48 for controlling refrigerant flow and lubricant flow, respectively, in the compressors 12 and 14, a mixing chamber 50 for mixing two-phase refrigerant from the economizer 22 and refrigerant vapor from the compressor 12, outdoor, indoor, and floor temperature sensors 52, 54, and 56, pressure sensors 58 and 60 for sensing the evaporating and condensing pressures within the heat pump system 10, and a control unit 62 for controlling the heat pump system 10 and its various components. As described above, the heat pump system 10 is configured for use with an interior hydronic system (not shown) coupled with the indoor refrigerant-water heat exchanger in combination with a forced air heating/cooling system coupled with the indoor refrigerant-air heat exchanger 18. However, preferred aspects of the heat pump system 10 may also be used with any conventional interior heat exchange system, such as a conventional forced air heating/air-conditioning system.

The system 10 can be generally and preferably physically separated into three main units, as indicated in FIG. 1. An indoor heating/cooling unit of the system 10 includes the heat exchanger 18 (with fan), expansion device 40, and temperature sensor 54, all of which can be located inside a heating/cooling duct system of the house. An outdoor unit of the system 10 includes the heat exchanger 20 (with fan), expansion device 38, and temperature sensor 52, all of which can be located outside the house for absorbing heat from and dissipating heat to the ambient outside environment outside the house. Finally, the main unit of the system 10 contains the remaining system components, including the compressors 12 and 14, economizer 22, heat exchanger 16, control unit 62, etc.

The operation of the system 10 will now be described in reference to the following modes of operation: a two-stage heating mode for very cold ambient temperatures; a single-stage heating mode for cooler ambient temperatures; an air-conditioning (cooling) mode for warm to hot ambient temperatures; and a defrosting mode for defrosting the coils of the outdoor heat exchanger 20 during winter.

Figure 2:
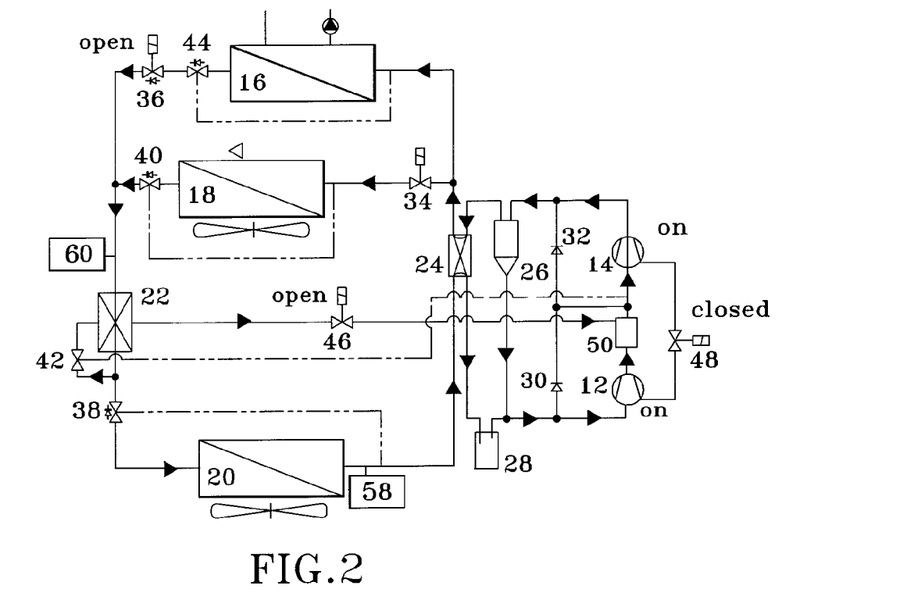
FIG. 2 schematically represents a two-stage heating mode for the fluid-carrying portion of the heat pump system of FIG. 1.

FIG. 2 schematically depicts the heat pump system 10 of FIG. 1 (the electrical components are omitted for clarity) in its two-stage heating mode for very cold ambient temperatures. As shown in FIG. 2, both compressors 12 and 14 are operated in series to meet the heating demands of a very cold ambient temperature. In this scenario, both the low stage compressor 12 and the high stage compressor 14 are activated and valves 30 and 32 are closed. The compressor 12 compresses the refrigerant from a low pressure to an intermediate pressure. The hot refrigerant vapor discharged from the compressor 12 then flows to the mixing chamber 50 where it is mixed with the two-phase refrigerant from the economizer 22 in order to reach a suitable lower inlet temperature for the high stage compressor 14. The temperature at the inlet of the compressor 14 is regulated with the expansion valve 42, which controls the refrigerant temperature at the inlet to the compressor 14 by adjusting the refrigerant flow rate through the economizer 22.

After compressing the refrigerant from the intermediate pressure achieved with the compressor 12 to the higher pressure achieved with the compressor 14, the gaseous refrigerant passes through a lubricant separator 26 where the lubricant (oil) is separated from the refrigerant. The lubricant is fed to the conduit connected to the inlet of the compressor 12, and is therefore drawn into the compressor 12 so that the lubrication of both compressors 12 and 14 is provided under all operating conditions.

After leaving the lubricant separator 26, the refrigerant vapor passes through the reversing valve 24 and enters the heat exchanger 16 (operating as a water-cooled condenser). At this point, two different interior heating scenarios are provided. In a first scenario, if the air heating to the house is switched off, the control valve 34 is closed and all of the refrigerant passes through the heat exchanger 16 where it is liquefied and transfers heat to the return water of the hydronic system, after which the resulting liquid refrigerant passes through the bypass valves of 44 and 36. In the second scenario, if air heating to the house is switched on, the control valve 34 is open and part of the refrigerant will pass through the air-cooled condenser 18 and release heat to the air of the forced air heating/cooling system of the house. The capacity of the heat exchanger 18 is preferably smaller than the capacity of the heat exchanger 16, so that at least a portion of the refrigerant passes through the heat exchanger 16. The control valve 34 is controlled by the surface temperature of the heat exchanger 18 and the outlet temperature of the heat exchanger 18 to ascertain a certain subcooling of the refrigerant.

The liquid refrigerant exiting the heat exchanger 18 joins the refrigerant stream from the solenoid valve 36 and then flows through the economizer 22, where heat is extracted, as understood by those skilled in the art and discussed below. After passing through the economizer 22, the refrigerant is separated into two portions. A smaller portion of the refrigerant passes through the expansion valve 42 to the economizer 22, where it is partly evaporated. The partially evaporated (two-phase) refrigerant then passes though the solenoid valve 46 and into the mixing chamber 50, where it is mixed with the hot discharge vapor from the compressor 12 as described above. The remaining and larger portion of the refrigerant passes through the expansion device 38, which is controlled by the superheat of the heat exchanger 20. The refrigerant then passes through the heat exchanger 20, where it evaporates using heat drawn from the ambient air outside the house. Afterwards, the refrigerant flows through the reversing valve 24 to the suction gas accumulator 28, which regulates the refrigerant flow to the compressors 12 and 14 and thus protects the compressor 12 from damage, especially during the startup of the system 10. The refrigerant vapor leaving the suction gas accumulator 28 is then mixed with the lubricant leaving the lubricant separator 26 and enters the compressor 12, at which point the cycle repeats.

Figure 3:
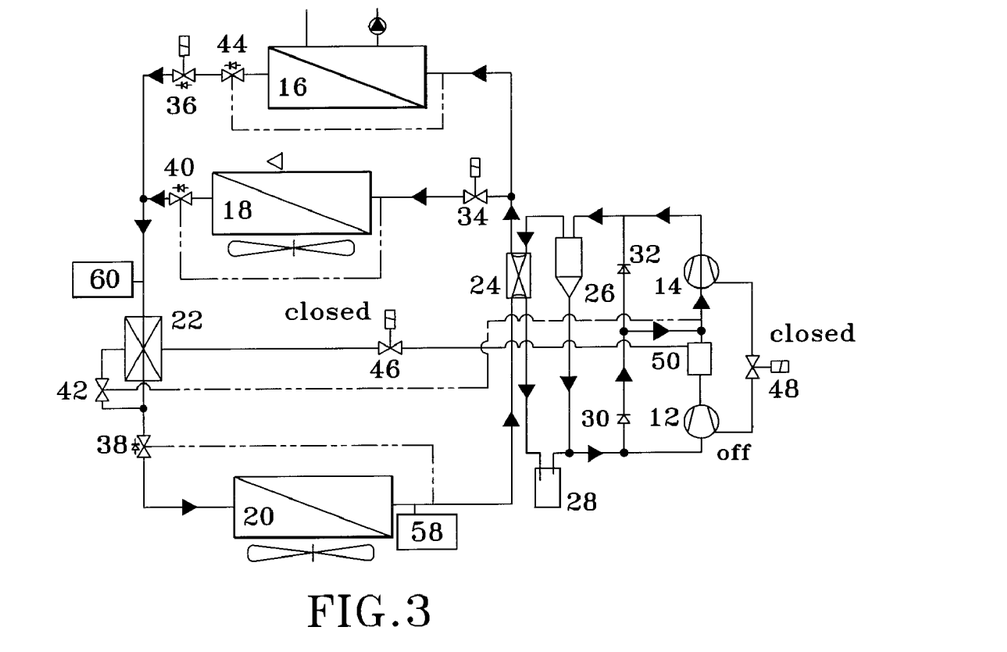
FIG. 3 schematically represents a single-stage heating mode for the fluid-carrying portion of the heat pump system of FIG. 1.

FIG. 3 represents the single-stage heating mode of the heat pump system 10 suitable for operation in cool ambient temperatures. In this mode, only one of the compressors 12 and 14 need be operated (with the other bypassed) to meet the lower heating requirements of the cool ambient temperatures. The check valve 30 in fluidic parallel with the compressor 12 is open so that the low stage compressor 12 is bypassed, and the check valve 32 is closed so that the refrigerant is directed exclusively to the high stage compressor 14, which therefore is operated independently to compress the refrigerant from low pressure to high pressure. Alternatively, the check valve 30 could be closed and the check valve 32 opened so that the refrigerant flow is directed exclusively to the low stage compressor 12, with the high stage compressor 14 being bypassed. If the compressor 12 is operated independently, the refrigerant is first compressed by the compressor 12 before entering the mixing chamber 50, which is inactive as a result of the solenoid valve 46 being closed, as discussed below. From the mixing chamber 50, the refrigerant bypasses the compressor 14 by using the flow path through the check valve 32 and enters the lubricant separator 26. Thereafter, the refrigerant circuit functions essentially the same as the two-stage mode described above with reference to FIG. 2. When the refrigerant vapor passes through the lubricant separator 26, the lubricant is separated from the refrigerant and added back to the low pressure line to the compressors 12 and 14 in order to guarantee lubrication for the compressors 12 and 14. After leaving the lubricant separator 26, the refrigerant passes through the reversing valve 24 and enters both the heat exchanger (water-cooled condenser) 16 and the control valve 34, at which point the two different scenarios for water-heating only and combined air-heating and water-heating can be carried out, as described above.

After the liquid refrigerant leaves the indoor heat exchangers 16 and/or 18, it enters the inactive economizer without changing its state since flow through the injection line to the economizer 22 is prevented by the closed solenoid valve 46. Because of the solenoid valve 46 is closed, the refrigerant stream is not split into the two above-noted portions after leaving the economizer 22. Instead, the entire refrigerant volume is expanded by the expansion device 38, which is again controlled by the superheat of the outdoor heat exchanger 20. The refrigerant then passes through the heat exchanger 20, where it evaporates using heat drawn from the ambient air outside the house. Thereafter, the refrigerant flows through the reversing valve 24 to the suction gas accumulator 28, which regulates the refrigerant flow to the compressors 12 and 14 as discussed above. The refrigerant vapor leaving the suction gas accumulator 28 is then mixed with the lubricant leaving the lubricant separator 26, at which point the cycle repeats.

Figure 4:
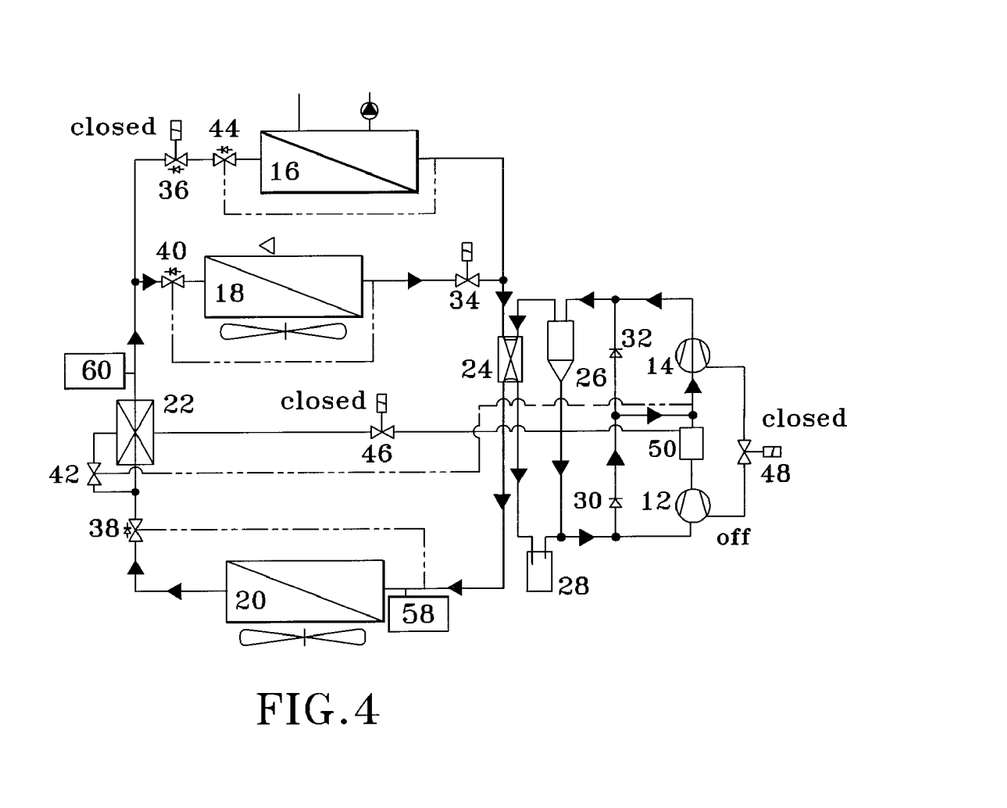
FIG. 4 schematically represents a cooling mode for the fluid-carrying portion of the heat pump system of FIG. 1.

FIG. 4 represents the air-conditioning (cooling) mode suitable for warm to hot ambient temperatures. As shown in FIG. 4, to operate in the air-conditioning mode, the solenoid valves 36 and 46 are closed, the control valve 34 is opened, and the reversing valve 24 is actuated to an air-conditioning position. The low pressure refrigerant vapor bypasses the compressor 12 by using the flow path through the check valve 30, and is compressed in the compressor 14. The refrigerant vapor then flows to the lubricant separator 26, where the lubricant is separated from the refrigerant and added back to the low pressure line to the compressors 12 and 14 as discussed previously. After leaving the lubricant separator 26, the refrigerant vapor passes through the reversing valve 24 to enter the outdoor heat exchanger 20 (now acting as a condenser), where the refrigerant condenses by dissipating heat to the ambient air drawn by the fan through the heat exchanger 20. The liquid refrigerant then flows through the economizer 22, which again is inactive as a result of the valve 46 being closed. As a result, the state of the refrigerant remains unchanged. In addition, the solenoid valve 36 is closed, causing the refrigerant to enter the indoor heat exchanger 18 after passing through the expansion device 40, which is controlled by the evaporating pressure and outlet temperature of the heat exchanger 18. While passing through the heat exchanger 18, the refrigerant evaporates by absorbing heat from the air stream drawn from the house interior, thus cooling the indoor air. Finally, the refrigerant flows through the open control valve 34 and through the reversing valve 24 to the suction gas accumulator 28, is mixed with the lubricant leaving the lubricant separator 26, and proceeds to the valve 30, at which point the cycle repeats.

Figure 5:
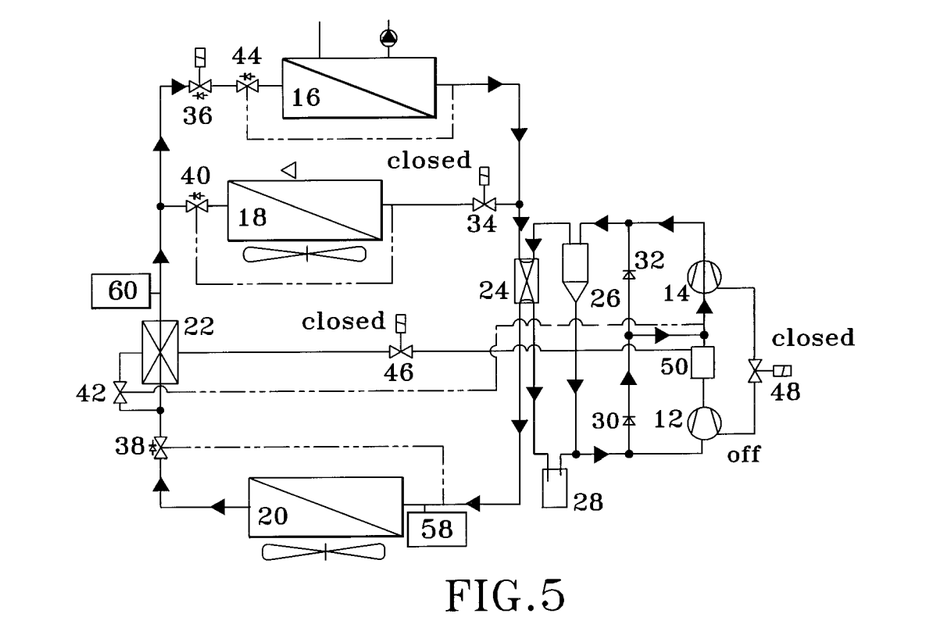
FIG. 5 schematically represents a defrost mode for the fluid-carrying portion of the heat pump system of FIG. 1.

FIG. 5 represents the defrosting mode of the system 10 for defrosting the outdoor coil of the heat exchanger 20, as need from time to time during winter as a result of ice buildup exceeding a predetermined limit. The ice buildup, caused by freezing of the moisture of the ambient air at evaporating temperatures below the freezing point, decreases the efficiency of the system 10 because the airflow across the coil of the heat exchanger 20 is reduced and the evaporating temperature of the heat pump decreases.

In order to enter the defrost mode, the compressor 12 is turned off and the solenoid valve 46 is closed while compressor 14 is running. The reversing valve 24 is then changed to air-conditioning mode, the solenoid valve 36 is kept open, and the control valve 34 is closed. This condition is held as long as the defrosting cycle lasts, which can be terminated either by a timer or a temperature control on the coil of the heat exchanger 20. The outdoor fan can also be turned off in order to decrease the heat loss over the coil and, therefore, reduce the defrost time. To leave the defrosting mode, the reversing valve 24 is switched back to heating mode and the other valves are switched back to their positions before entering the defrost mode.

In FIG. 5, only the high stage compressor 14 is indicated as running in the defrost mode. The low pressure refrigerant from the suction side bypasses the compressor 12 by using the flow path through the check valve 30, and is then compressed by the compressor 14 before flowing to the lubricant separator 26, whose operation is the same as that described above for the other operating modes. After leaving the lubricant separator 26, the refrigerant passes through the active reversing valve 24 and enters the heat exchanger 20, where it condenses by dissipating heat to the heat exchanger 20. If the outdoor air fan is turned off, most of the refrigerant heat is used to melt the frost and, therefore, defrost the outdoor coil. After leaving the heat exchanger 20, the liquid refrigerant flows through the device 38 and flows through the economizer 22, which is again inactive because the valve 46 is closed. The refrigerant, whose state is unchanged by the inactive economizer 22, flows to only the heat exchanger 16 as a result of the valve 34 being closed and the valve 36 being open. Before entering the heat exchanger 16, the refrigerant is expanded by the expansion device 44, after which the expanded refrigerant is evaporated in the heat exchanger 16 using the heat of the hydronic system, which has an almost imperceptible effect on the hydronic system since the thermal mass of the hydronic system is high and the duration of the defrost mode is short. After leaving the heat exchanger 16, the liquid refrigerant proceeds to the reversing valve 24 and then the suction gas accumulator 28, where the remaining cycle is the same as described for the other modes of operation.

As known in the art, because of the inherently different lubricant circulation rates of the two compressors 12 and 14, the system 10 will experience lubricant migration from one compressor to the other depending on the operating conditions of the system 10. If the level of the lubricant sump of one compressor is too low, lubrication cannot be guaranteed for that compressor and the reliability of the compressor will decrease drastically. Therefore, lubricant equalization is essential to keep the system 10 running. To address this issue, the heat pump system 10 of this invention preferably incorporates a lubricant equalization subsystem that operates when both compressors 12 and 14 are not operating, since the difference in suction pressure of the compressors 12 and 14 is much higher than the static pressure difference of the different heights in lubricant level. Lubricant equalization is accomplished by opening the solenoid valve 48 (shown closed in FIGS. 2 through 5) whenever both compressors 12 and 14 are not operating. To ensure the lubricant will equalize when the valve 48 is opened, both compressors 12 and 14 are preferably mounted at the same level so that the static pressure difference between the lubricant level of the compressors 12 and 14 is negligible. Lubricant equalization can be initiated by the control unit 62 whenever the heat pump system 10 is turned off, and is automatically terminated by the control unit 62 before starting either of the compressors 12 or 14.

During colder months, the system 10 can be operated in either of the two-stage or single-stage heating modes. According to a preferred aspect of the invention, the single-stage heating mode is preferably used whenever the pressure ratio between the evaporating and condensing pressures is small. If the pressure ratio between the evaporating and condensing pressures rises to a predetermined level at which the compressors 12 and 14 could be damaged when operating in the single-stage mode, the control unit 62 causes the other compressor 12 or 14 to start, and the heat pump system 10 begins operating in the two-stage mode. As represented in FIGS. 1 through 5, the evaporating and condensing pressures can be measured directly using the pressure sensors 58 and 60, respectively, which are shown at preferred locations within the system 10, though other locations are possible as long as one of the sensors 58 or 60 is on the high pressure side and the other on the low pressure side of the system 10. Alternatively, these pressures could be calculated from the evaporating and condensing temperatures as measured by temperature sensors. However, this approach would require placement of temperature sensors directly at the heat exchangers 16, 18, and 20. After obtaining the evaporating and condensing pressures using either method, the ratio of the evaporating pressure to the condensing pressure can be calculated by the control unit 62.

The two-stage operation of the heat pump system 10 can also be initiated if the required heat load is higher than a predetermined limit exceeding the heat output of a single compressor. To decide which compressor 12 or 14 is running in single-stage mode, two conditions can be applied. First, damage to the compressors 12 and 14 must be prevented by not exceeding the operation limits of either compressor 12 and 14. Second, the particular compressor 12 or 14 to be operated in the single-stage mode may be selected based on the heat demand. The states of the different valves have already been defined in the description of the four different operating modes depicted in FIGS. 2 through 5. The temperatures to detect the heat demand and the limiting conditions of the compressors 12 and 14 are preferably measured at the outdoor coil of the heat exchanger 20, on the indoor coil of the heat exchanger 18, in the ambient air, and at the floor or indoor air of the house. Additional sensors may also be used to improve the control and allow for greater flexibility.

Figure 6:
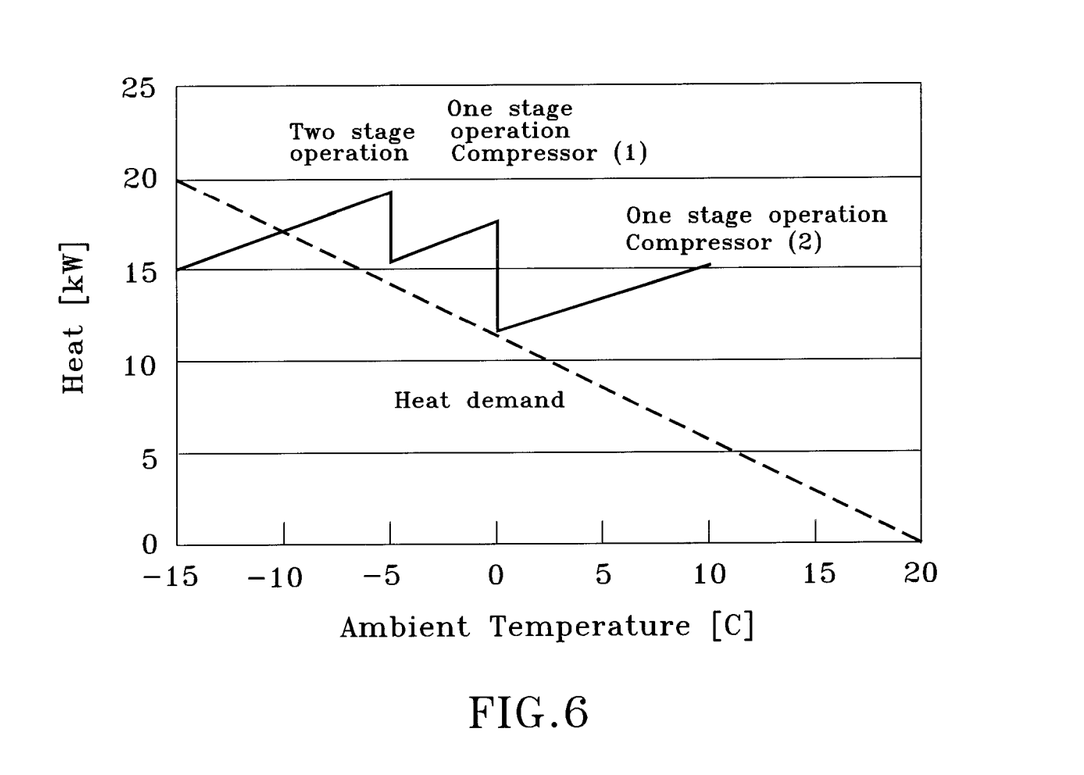
FIG. 6 is a graph plotting the heat demand and heat output versus ambient temperature characteristic of the heat pump system of FIG. 1.

A schematic of the heat output of the described heat pump system 10 and the heat demand for a residential house versus the ambient temperature is plotted in FIG. 6. As described above, the compressors 12 and 14 are capable of being operated independently or in series for maximum output, depending on the demands of the environmental conditions. The compressors 12 and 14, which can be lowcost fixed-speed compressors of known design, can also be operated with or without the economizer 22, depending on the required heating capacity. Thus, as shown in Table I below, six separate operating capacities may be achieved with the heat pump system 10 using fixed-speed compressors.

TABLE I

| OPERATING MODE | COMPRESSORS | | ECONOMIZER |
| --- | --- | --- | --- |
| | 12 | 14 | 22 |
| 2-Stage Heating with Economizer 22 | ON | ON | ON |
| 2-Stage Heating without Economizer 22 | ON | ON | OFF |
| 1-Stage heating with Compressor 12 | ON | OFF | OFF |
| 1-Stage heating with Compressor 14 | OFF | ON | OFF |
| 1-Stage cooling with Compressor 12 | ON | OFF | OFF |
| 1-Stage cooling with Compressor 14 | OFF | ON | OFF |

Alternatively, a variable speed compressor may be used as the high-stage compressor 14 to achieve still further flexibility in heating capacity. As shown in the following chart, ten separate operating capacities may be achieved with this approach.

TABLE II

| OPERATING MODE | COMPRESSORS | | ECONOMIZER |
| --- | --- | --- | --- |
| | 12 | 14 | 22 |
| 2-Stage Heating with Economizer 22 | ON | HIGH | ON |
| 2-Stage Heating without Economizer 22 | ON | HIGH | OFF |
| 2-Stage Heating with Economizer 22 | ON | LOW | ON |
| 2-Stage Heating without Economizer 22 | ON | LOW | OFF |
| 1-Stage heating with Compressor 12 | ON | OFF | OFF |
| 1-Stage heating with Compressor 14 | OFF | HIGH | OFF |
| 1-Stage heating with Compressor 14 | OFF | LOW | OFF |
| 1-Stage cooling with Compressor 12 | ON | OFF | OFF |
| 1-Stage cooling with Compressor 14 | OFF | HIGH | OFF |
| 1-Stage cooling with Compressor 14 | OFF | LOW | OFF |

In view of the above, the present heat pump system 10 offers various advantages over existing heat pump systems.

The flexible configuration of the compressors 12 and 14 and economizer 22 allows for the generated heat to closely follow and quickly respond to ambient conditions and heat demands, improving the thermal comfort of the interior of a house and decreasing the costs of operation. System performance is increased because the system 10 does not need to cycle on and off as frequently as prior art systems. The multiple compressor configuration of the present invention can also be easily adapted to existing air handling and heat exchange systems, allowing the present invention to be easily adapted to existing systems.

The lubricant management system is configured to accommodate the needs of multiple compressors configured to operate in series, and provides better performance by preventing lubricant flow through the heat exchangers 16, 18 and 20. Specifically, performance is increased because the thermal resistance of the heat exchangers 16, 18, and 20 is lower if a lubricant film is not present on their tube walls. Also, the lubricant equalization between the compressors 12 and 14 ensures more even lubrication of the compressors 12 and 14 to improve system performance and reliability of the compressor section of the heat pump system 10. The flow path on the suction side of the compressors 12 and 14 also inhibits lubricant from migrating to the inactive compressor 12/14 while the system 10 is running in the single-stage mode, further improving the reliability of the system 10.

Another advantage is that the system 10 can be configured to be physically separated into three units: an indoor air unit containing the heat exchanger 18 (and accessories); an outdoor air unit containing the heat exchanger 20 (and accessories); and a main unit containing the compressors 12 and 14, heat exchanger 16, control unit 62, economizer 22 (optional), and accessories. Because of the lower weight and smaller size of each component of the system 10, transport of the components is easier and less expensive. The separation of the compressors 12 and 14 from the heat exchangers 18 and 20 is advantageous because the outdoor unit (containing the heat exchanger 20) does not include the compressors 12 and 14, allowing for a greater degree of freedom for the design of the heat exchanger 20, with the potential for increased performance, more economical construction, and optimization of the drainage of condensate from the heat exchanger 20. Furthermore the compressors 12 and 14 can be installed to be more easily serviced since they are not required to be surrounded by any of the heat exchangers 16, 18, and 20. The compressors 12 and 14 can also be housed in a noise-damping enclosure since openings for air coils are not needed. Because the compressors 12 and 14 are the loudest part of the system 10, the noise level of the overall system 10 can thus be reduced. The compressors 12 and 14 may also be located indoors, eliminating the need for crankcase heating on startup and providing better performance, lower running cost, and increased reliability.

While a particular embodiment has been described and represented in the Figures, various modifications are also within the scope of the invention. For example, though the heat pump system 10 has been described for use as a residential heating and cooling system, the present invention is not limited to residential applications, but could also be used in commercial and industrial applications and accommodations. In addition, the expansion valve 42 and solenoid valve 46 could be replaced by a single electronic expansion valve to provide more accurate control of the refrigerant flow and to eliminate the need to use two valves. A bypass solenoid valve could be installed parallel to the compressor 12 and its bypass valve 30 to more quickly equalize the suction pressures of the compressors 12 and 14. Such a modification can more rapid lubricant equalization immediately after the compressors 12 and 14 are turned off and the bypass solenoid valve is opened. Another possible modification is to rely on natural defrosting at ambient temperatures above, for example, 2° C., since air at such temperatures can provide enough heat to defrost the coil of the heat exchanger 20 by providing air flow through the outdoor coil.

In view of the above, though the invention has been described in terms of a preferred embodiment, it is apparent that other forms could be adopted by one skilled in the art. Therefore, the scope of the invention is to be limited only by the following claims.

The invention claimed is:

1. A heat pump system comprising:
a compressor section comprising first and second compressors, each having an inlet and an outlet;
first and second heat exchangers selectively fluidically connected to the compressor section so as to enable flow of a refrigerant between the compressor section and the first heat exchanger, between the first and second heat exchangers, and between the compressor section and the second heat exchanger;
means for separating a lubricant from the refrigerant flowing from the compressor section, the lubricant separating means having an inlet, a refrigerant outlet, and a lubricant outlet, the inlet of the lubricant separating means being fluidically connected to the outlets of the first and second compressors so as to receive the refrigerant flowing from at least one of the first and second compressors, the refrigerant outlet of the lubricant separating means being selectively fluidically connected to one of the first and second heat exchangers, the lubricant outlet of the lubricant separating means being fluidically connected to the inlets of the first and second compressors so as to return the lubricant separated from the refrigerant by the lubricant separating means to at least one of the first and second compressors;
a lubricant equalization conduit fluidically coupled to only the first and second compressors;
valve means for selectively fluidically connecting the first and second compressors through the lubricant equalization conduit and for selectively controlling flow of the lubricant through the lubricant equalization conduit from the first compressor to the second compressor or from the second compressor to the first compressor so as to provide for equalization of levels of the lubricant in the first and second compressors;
valves for controlling the flow of the refrigerant through the first and second compressors and the first and second heat exchangers; and
means for controlling the valves so that the heat pump system is selectively operable in each of the following modes:
the first and second compressors operating in series wherein the first compressor operates as a low stage compressor and the second compressor operates as a high stage compressor;
the first compressor operating independently wherein the second compressor is bypassed by the refrigerant; and
the second compressor operating independently wherein the first compressor is bypassed by the refrigerant.

2. A heat pump system comprising:
a compressor section comprising first and second compressors, each having an inlet and an outlet;

first and second heat exchangers selectively fluidically connected to the compressor section so as to enable flow of a refrigerant between the compressor section and the first heat exchanger, between the first and second heat exchangers, and between the compressor section and the second heat exchanger;

valves for controlling the flow of the refrigerant through the first and second compressors and the first and second heat exchangers;

means for controlling the valves so that the heat pump system is selectively operable in each of the following modes:
  the first and second compressors operating in series wherein the first compressor operates as a low stage compressor and the second compressor operates as a high stage compressor;
  the first compressor operating independently wherein the second compressor is bypassed by the refrigerant; and
  the second compressor operating independently wherein the first compressor is bypassed by the refrigerant;

a lubricant equalization conduit fluidically coupled to the first and second compressors; and valve means for selectively fluidically connecting the first and second compressors through the lubricant equalization conduit and for selectively controlling flow of the lubricant through the lubricant equalization conduit so as to provide for equalization of levels of the lubricant in the first and second compressors;

wherein the valve means operates to prevent flow of the lubricant through the lubricant equalization conduit if either of the first and second compressors are operating and operates to permit flow of the lubricant through the lubricant equalization conduit if both of the first and second compressors are not operating.

3. A heat pump system comprising:

a compressor section comprising first and second compressors, each having an inlet and an outlet;

first and second heat exchangers selectively fluidically connected to the compressor section so as to enable flow of a refrigerant between the compressor section and the first heat exchanger, between the first and second heat exchangers, and between the compressor section and the second heat exchanger;

valves for controlling the flow of the refrigerant through the first and second compressors and the first and second heat exchangers;

means for controlling the valves so that the heat pump system is selectively operable in each of the following modes:
  the first and second compressors operating in series wherein the first compressor operates as a low stage compressor and the second compressor operates as a high stage compressor;
  the first compressor operating independently wherein the second compressor is bypassed by the refrigerant; and
  the second compressor operating independently wherein the first compressor is bypassed by the refrigerant;

means for separating a lubricant from the refrigerant flowing from the compressor section, the lubricant separating means having an inlet, a refrigerant outlet, and a lubricant outlet, the inlet of the lubricant separating means being fluidically connected to the outlets of the first and second compressors so as to receive the refrigerant flowing from at least one of the first and second compressors, the refrigerant outlet of the lubricant separating means being selectively fluidically connected to one of the first and second heat exchangers, the lubricant outlet of the lubricant separating means being fluidically connected to the inlets of the first and second compressors so as to return the lubricant separated from the refrigerant by the lubricant separating means to at least one of the first and second compressors;

a lubricant equalization conduit fluidically coupled to the first and second compressors; and valve means for selectively fluidically connecting the first and second compressors through the lubricant equalization conduit and for selectively controlling flow of the lubricant through the lubricant equalization conduit so as to provide for equalization of levels of the lubricant in the first and second compressors;

wherein the valve means operates to prevent flow of the lubricant through the lubricant equalization conduit if either of the first and second compressors are operating and operates to permit flow of the lubricant through the lubricant equalization conduit if both of the first and second compressors are not operating.

* * * * *

UNITED STATES PATENT AND TRADEMARK OFFICE
CERTIFICATE OF CORRECTION

PATENT NO. : 7,654,104 B2
APPLICATION NO. : 11/420951
DATED : February 2, 2010
INVENTOR(S) : Eckhard A. Groll et al.

It is certified that error appears in the above-identified patent and that said Letters Patent is hereby corrected as shown below:

Title Page, item (75) Inventors should read -- (75) Inventors: Eckhard A. Groll, West Lafayette, IN (US); William J. Hutzel, Lafayette, IN (US); Stefan S. Bertsch, Lafayette, IN (US); David B. Bouffard, Biddeford, ME (US) --.

Signed and Sealed this

Sixteenth Day of March, 2010

David J. Kappos
*Director of the United States Patent and Trademark Office*